United States Patent

[11] 3,587,766

| [72] | Inventor | Peter M. Slade<br>Issaquah, Wash. |
|---|---|---|
| [21] | Appl. No. | 858,776 |
| [22] | Filed | Sept. 17, 1969 |
| [45] | Patented | June 28, 1971 |
| [73] | Assignee | Caterpillar Tractor Co.<br>Peoria, Ill. |

[54] AUXILIARY TURBINE BRAKING SYSTEM FOR FREE-TURBINE GAS-TURBINE ENGINES
10 Claims, 1 Drawing Fig.

[52] U.S. Cl. ................................................. 180/66-A, 60/3918-C
[51] Int. Cl. ................................................. B60k 3/04
[50] Field of Search ................................................. 180/66 (A); 60/39.18 (C), 39.18 (B), 39.16 (R)

[56] References Cited
UNITED STATES PATENTS

| 2,374,510 | 4/1945 | Traupel | 60/39.18(C) |
|---|---|---|---|
| 2,591,540 | 4/1952 | Grylls | 180/66(A) |
| 2,619,797 | 12/1952 | Haworth | 60/39.16(R) |
| 2,658,336 | 11/1953 | Traupel | 60/39.18(C) |
| 2,742,760 | 4/1956 | Hodge | 180/66(A)X |
| 3,188,807 | 6/1965 | Rogers | 60/39.16(R) |
| 3,237,404 | 3/1966 | Flanigan et al. | 60/39.16(R) |
| 3,488,947 | 1/1970 | Miller et al. | 180/66(A)X |
| 3,514,945 | 6/1970 | Austin | 60/39.16(R) |

*Primary Examiner*—Benjamin Hersh
*Assistant Examiner*—Milton L. Smith
*Attorney*—Fryer, Tjensvold, Feix, Phillips and Lempio

ABSTRACT: In a gas-coupled or free-turbine gas-turbine engine an auxiliary turbine is connected through a valve to receive compressor delivery air and has its shaft output drivingly connected to the gear train driven by the power turbine whereby increased power absorbing capacity can be obtained during power regeneration by opening the valve. By controlling the flow of compressor delivery air to the auxiliary turbine modulation of the power-absorbing capacity of the engine can be obtained.

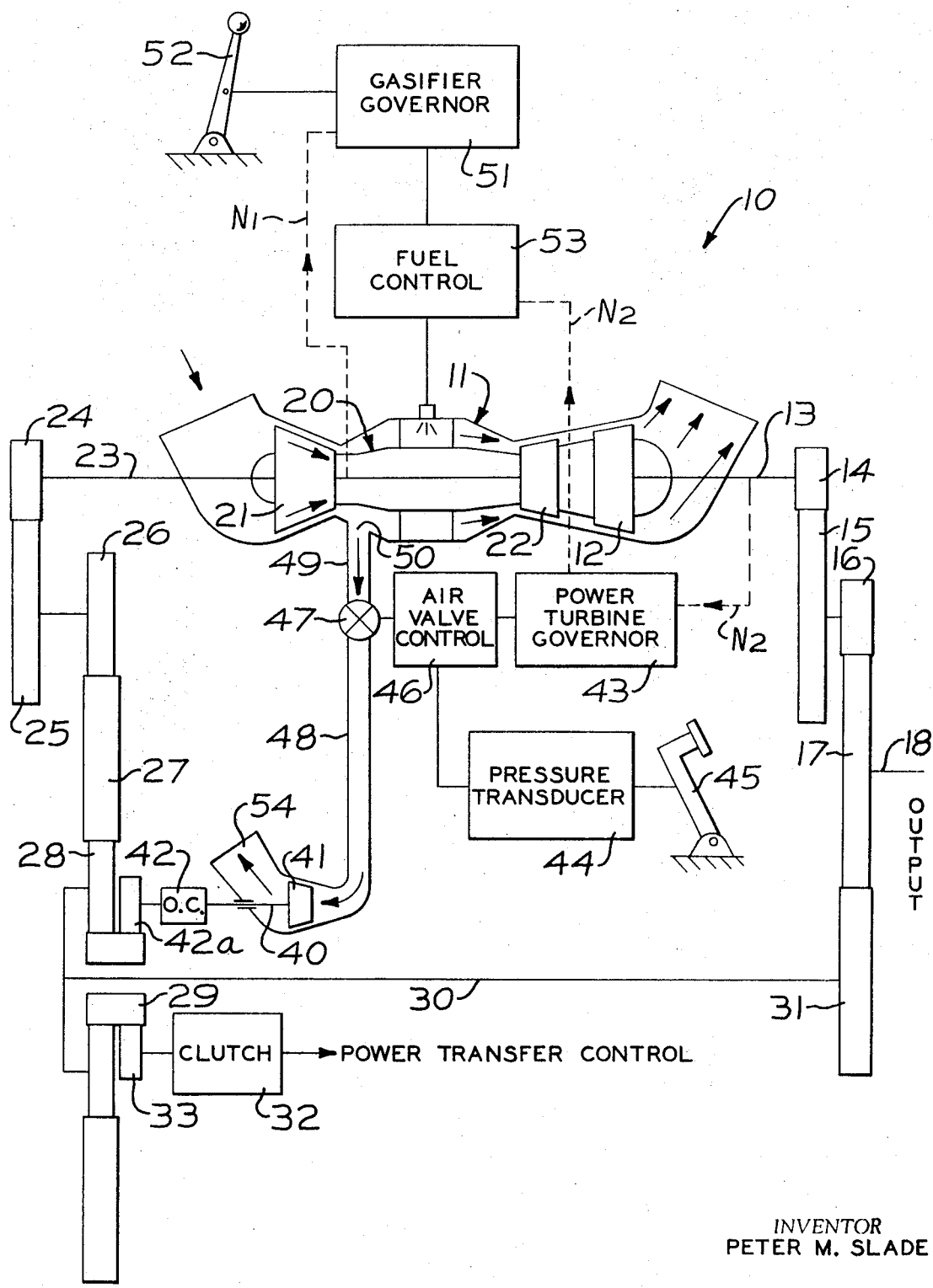

3,587,766

AUXILIARY TURBINE BRAKING SYSTEM FOR FREE-TURBINE GAS-TURBINE ENGINES

BACKGROUND OF THE INVENTION

Gas-coupled or free-turbine gas-turbine engines are finding increasing application in vehicles, ships and the like wherein their operating characteristics must be taken into consideration. Particular attention has been given to techniques for improving the efficiency of these types of gas turbine engines used at loading factors below 50 percent of full power. The transfer of some of the energy in the gasifier section consisting of the compressor and its drive turbine to the gear train driven by the power turbine is one technique to improve specific fuel consumption at these lower load factors. U.S. Pat. No. 3,188,807 issued to Rodgers and U.S. Pat. No. 3,237,404 issued to Flanigan et al. disclose arrangements to improve operating efficiencies by a controllable coupling between the gasifier and the power turbine. A similar arrangement is shown in U.S. Pat. No. 2,374,510 issued to Traupel.

These controllable couplings between the free turbine or power turbine also are employed during power regeneration for absorbing energy by connecting the power turbine to drive the gasifier section of the engine. Simple arrangements, where a one-way overrun clutch is employed between the gasifier section and the power turbine allow power to be absorbed by the gasifier section when the power turbine speed exceeds that of the gasifier section during power regeneration. U.S. Pat. No. 2,619,797 issued to Haworth is illustrative of such arrangements.

Except for the simple overrun clutch approach, all of the above systems accomplishing an interchange of power from the power turbine to the gasifier section during power regeneration involve heavy and inefficient mechanical arrangements making them less attractive for vehicular applications. Further, all of these known arrangements have failed to use the full braking capability available in gas-coupled turbine engines. Additionally, such arrangements often cannot be effectively modulated in their power absorbing capacity, even when accompanied with compressor delivery air blowoff valves. Power-absorbing capabilities of these known systems also drop off sharply with decreasing power turbine shaft speed which is undesirable. As a result in vehicular applications the conventional braking system must have nearly the same capacity as would be necessary without some power-absorbing capacity from the gas-coupled or free-turbine engine.

An object of the current invention is to achieve maximum braking or power-absorbing capacity in a gas-coupled turbine engine employed in vehicular applications during power regeneration.

Another object is to achieve increased and constant power-absorbing capacity throughout the full operating range of a gas-coupled turbine engine.

Also it is an object to provide power turbine overspeed protection during variable loadings on its driven components.

A further object is to incorporate a lightweight, turbine braking system in gas-coupled turbine engines to achieve increased power-absorbing capability at nominal costs.

SUMMARY OF THE INVENTION

The above objects and many other advantages can be obtained in a gas-coupled turbine engine having a controlled mechanical coupling between its gasifier and its power turbine by employing a separate, auxiliary turbine, conduits connecting the auxiliary turbine to receive the compressor delivery air, a control valve controlling the flow of compressor delivery air through the conduits and differential gearing connecting the shaft of the auxiliary turbine to the mechanical coupling whereby the gasifier can be driven to its maximum speed independent of power turbine speed during power regeneration for maximum power-absorbing capacity by employing the shaft energy from the auxiliary turbine. The control valve is operated by a control circuit that correlates the valve's operation with the gasifier speed governor and the power turbine speed governor to achieve both maximum braking capacity and power turbine overspeed protection.

BRIEF DESCRIPTION OF THE DRAWING

The accompanying drawing schematically illustrates a gas-coupled turbine engine with a controllable mechanical coupling between its power turbine and gasifier section along with an auxiliary turbine drivingly associated with the mechanical coupling and a control valve with control circuitry for operating the system.

Referring to the drawing, the illustrated schematic represents a gas turbine drive system 10 suitable for employment in earthworking vehicles, trucks and the like where power regeneration is likely to occur. The gas turbine 11 is of the gas-coupled or free-turbine type wherein the power turbine 12 through shaft 13 gears 14, 15, 16 and 17 delivers power (torque) to an output shaft 18.

This type of turbine is desired in vehicular applications because of its great flexibility in that the speed of the power turbine, hence the output shaft, can vary widely without affecting the speed gasifier section 20 which consists of a compressor 21 and a gasifier drive turbine 22 which are not mechanically connected to the power turbine or its output shaft. For improved efficiency in this type of turbine at lower load factors (one-half or less of full power), the shaft 23 connecting the gasifier drive turbine and the compressor is connected to gear 24 which is drivingly engaged through gears 25, 26 with gears 27, 28 and 29 of an epicyclic gear train. The planet gears 28 of the epicyclic gear train are connected to shaft 30 which, through gear 31 engaged with gear 17, will transmit some of the energy in the gasifier section to the output shaft 18 when clutch 32 restricts the rotation of sun gear 29 through its associated connection via gear 33.

Clutch 32 would be employed in a conventional manner, such as the illustrated power clutch in the aforementioned Flanigan patent, to improve specific fuel consumption at lower power settings. Somewhere above half load the gasifier is decoupled from the power turbine output.

The output shaft 40 of an auxiliary turbine 41 is also connected through an overrun clutch 42 and a gear 42a to sun gear 29. Clutch 32 is employed to transmit excess energy in the gasifier to the power turbine output at the lower load factors while the auxiliary turbine operates during power regenerating conditions where torque on output shaft 18 tends to drive the power turbine 12 at increasing speeds. Such a situation occurs when a truck driven through output shaft 18 is proceeding down a fairly steep grade. Clutch 32 would be deactivated under power regeneration conditions when the auxiliary turbine would be employed.

Assuming power regeneration is occuring a signal from the power turbine governor 43 or a pressure transducer 44 operated by foot brake pedal 45 will actuate air valve control 46 which will modulate the opening of valve 47 thereby controlling the flow of compressor delivery air through conduits 48 and 49 to the auxiliary turbine 41. The foot brake pedal can be employed separately or in conjunction with the conventional brakes on the vehicle. Further, its signal will be proportional to the pressure applied. As this valve opens compressor delivery air from a port 50 in the compressor casing will drive the auxiliary turbine.

Depending on the operating conditions the speed of the auxiliary turbine will increase until it drives sun gear 29 at a speed which will cause the regenerative power from shaft 30 through the epicyclic gearing to drive the gasifier at its maximum speed thereby developing the maximum braking capacity available from the engine. Since some of the air is bled via outlet 50 from the compressor, the mass flow through engine is less than normal with the gasifier operating at maximum speed during operation of the auxiliary turbine.

As the gasifier speed increases its speed signal $N_1$ is transmitted to the gasifier governor 51 controlled by throttle 52 which will represent a higher speed than called for by the throttle setting. As a result the governor will signal the fuel control 53 to decrease fuel to the engine, further increasing the power absorbing capacity of the engine.

With the epicyclic gear train illustrated the gear ratios are adjusted so the speed of the sun gear 29 will be zero at minimum gasifier rotational speed and a flyweight governor (not shown) can be employed with the auxiliary turbine to limit its speed by closing the air valve 47 when an overspeed occurs.

As indicated above an overspeed condition of the power turbine 12, such as would be caused by wheel slip or spin of the vehicle, the speed signal $N_2$ from the power turbine will cause the power turbine governor 43 to actuate the air control valve 46 whereby the auxiliary turbine 41 will cause the gasifier section to connect in the drive train to reduce the speed of the power turbine. This feature ensures maximum overspeed protection.

Air valve 47 can be modulated so that the braking action (power absorbing capacity) of the gas turbine engine can also be varied. Thus as the brake pedal 45 is depressed to its maximum (representing maximum pressure) the gasifier will be driven at its maximum speed with a reduced fuel flow (idle fuel flow) whereby maximum aerodynamic braking is achieved in the compresssor and the mass flow through the engine is reduced so that the power-absorbing capacity of the engine will exceed its maximum output horsepower. An off-highway vehicle proceeding down a steep grade would need such power-absorbing capacity to prevent vehicle runaway.

Actually, brake pedal 45 can be arranged to operate in a number of modes. It can be connected to the conventional brakes of the vehicle so the auxiliary turbine braking system will act simultaneously with or precede the application of the conventional brakes through the use of lost motion devices. In other vehicles it may be desirable to actuate the auxiliary turbine braking system automatically or through hand-operated levers.

Use of the small, lightweight auxiliary turbine is superior to employing heavy complex transmissions and/or hydrostatic drives and clutch which often require auxiliary fluid cooling units, with accompanying additional weight and cost.

The exhaust 54 from the auxiliary turbine 41 can be connected through ducting to the vehicle's conventional brakes to cool them when the auxiliary turbine system is being employed.

Alternatively a plurality of auxiliary braking turbines could be connected to each wheel of the vehicle through reduction gearing to absorb power during power regeneration. However, such an arrangement is less effective than the system described above.

I claim:

1. In combination with a gas-coupled turbine engine having a free power turbine connected to an output gear train and a gasifier composed of a compressor and a gasifier drive turbine, an improved power-absorbing system comprising:
 an auxiliary turbine having its shaft output connected in the output gear train connected to the power turbine;
 conduit means in communication with the compressor discharge and connected to said auxiliary turbine whereby part of the compressor delivery air can be routed to said auxiliary turbine and bypass said power turbine and said gasifier drive turbine;
 valve means associated with said conduit means to control the flow of compressor delivery air to said auxiliary turbine; and
 control means connected to said valve means operable to vent part of said compressor delivery air to said auxiliary turbine when power regeneration or variable loading on the output gear train tends to cause an increase in the speed of said power turbine whereby the shaft energy developed by said auxiliary turbine will oppose increases in the speed of said power turbine.

2. The combination defined in claim 1 wherein the output drive train driven by the power turbine is part of a vehicle drive system.

3. The combination defined in claim 2 wherein the output shaft of the auxiliary turbine is associated with a wheel of the vehicle through reduction gearing to oppose speed increases in the output drive train from power regeneration or slip of said wheel.

4. The combination in claim 3 wherein the exhaust of the auxiliary turbine is employed to cool the conventional brakes associated with its wheel.

5. In combination with a gas-coupled turbine engine having a free power turbine connected to an output gear train and a gasifier composed of a compressor and a gasifier drive turbine, an improved power-absorbing system comprising:
 a controllable mechanical coupling between the output gear train and the gasifier whereby power transfer can be accomplished between said gasifier and said output gear train;
 an auxiliary turbine having its output shaft coupled to said controllable mechanical coupling in a manner that its shaft energy can be employed to change the drive ratio between said output gear train and said gasifier;
 conduit means communicating with the compressor discharge and connected to said auxiliary turbine whereby part of the compressor delivery air can be routed to said auxiliary turbine thereby bypassing said power turbine and said gasifier drive turbine;
 valve means associated with said conduit means to control the flow of compressor delivery air through said conduit means; and
 control means connected to said valve means to open said valve means when power turbine speed increases due to power regeneration or wheel slip whereby the shaft energy developed by said auxiliary turbine will cause the gasifier to be increased in speed relative to the speed of the power turbine increasing the power-absorbing capacity of the engine.

6. The combination defined in claim 5 wherein the controllable mechanical coupling includes an epicyclic gear train and the auxiliary turbine has its shaft drivingly connected to said epicyclic gearing.

7. The combination as defined in claim 6 wherein the connection of the shaft of the auxiliary turbine includes an overrun clutch operable to engage said auxiliary turbine only when its speed exceeds that of its connected gear component in the epicyclic gear train.

8. The combination defined in claim 5 wherein the control means included means to modulate the valve means proportional to its input signals.

9. The combination defined in claim 8 wherein control means includes an input from a power turbine governor operable to open the valve means if overspeed occurs.

10. The combination as defined in claim 9 wherein the control means includes an input signal from a transducer which is manually controlled.